United States Patent
Sabol et al.

(10) Patent No.: US 7,582,359 B2
(45) Date of Patent: Sep. 1, 2009

(54) APPARATUS AND METHOD OF MONITORING OPERATING PARAMETERS OF A GAS TURBINE

(75) Inventors: Stephen M. Sabol, Orlando, FL (US); Ramesh Subramanian, Oviedo, FL (US); Anand A. Kulkarni, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 529 days.

(21) Appl. No.: 11/269,043

(22) Filed: Nov. 8, 2005

(65) Prior Publication Data
US 2006/0056959 A1    Mar. 16, 2006

Related U.S. Application Data

(63) Continuation-in-part of application No. 11/122,566, filed on May 5, 2005, and a continuation-in-part of application No. 11/018,816, filed on Dec. 20, 2004, now Pat. No. 7,270,890, which is a continuation-in-part of application No. 10/252,236, filed on Sep. 23, 2002, now Pat. No. 6,838,157.

(60) Provisional application No. 60/581,662, filed on Jun. 21, 2004.

(51) Int. Cl.
B32B 9/00 (2006.01)
(52) U.S. Cl. .............. 428/469; 428/472; 428/701; 702/182
(58) Field of Classification Search .............. None
See application file for complete search history.

(56) References Cited

U.S. PATENT DOCUMENTS

| 4,063,167 | A | 12/1977 | Duly |
|---|---|---|---|
| 4,546,652 | A | 10/1985 | Virkar et al. |
| 4,970,670 | A | 11/1990 | Twerdochlib |
| 5,119,036 | A | 6/1992 | Rickards et al. |
| 5,440,300 | A | 8/1995 | Spillman, Jr. |
| 5,760,593 | A | 6/1998 | Lawrence et al. |
| 5,797,414 | A | 8/1998 | Sirovich et al. |
| 5,867,302 | A | 2/1999 | Fleming |

(Continued)

OTHER PUBLICATIONS

Jon Longtin, Sanjay Sampath, Richard J. Gambino and Szymon Tankiewicz and Robert Greenlaw; "Sensors for Harsh Environments by Direct Write Thermal Spray"; pp. 1-4.

(Continued)

*Primary Examiner*—Timothy M Speer

(57) ABSTRACT

A component for use in a combustion turbine (10) is provided that includes a substrate (212) and a microelectromechanical system (MEMS) device (50, 250) affixed to the substrate (212). At least one connector (52) may be deposited in electrical communication with the MEMS device (50, 250) for routing a data signal from the MEMS device (50, 250) to a termination location (59). A barrier coating (216) may be deposited on the substrate (212) wherein the MEMS device (50, 250) is affixed beneath a surface of the barrier coating (216). A plurality of trenches (142) may be formed in the barrier coating (216) at respective different depths below the surface of the barrier coating (216) and a MEMS device (50, 250) deposited within each of the plurality of trenches (142). A monitoring system (30) is provided that may include a processing module (34) programmed for receiving data from the MEMS device (50, 250).

25 Claims, 8 Drawing Sheets

U.S. PATENT DOCUMENTS

| | | | |
|---|---|---|---|
| 5,952,836 | A | 9/1999 | Haake |
| 5,969,260 | A | 10/1999 | Belk et al. |
| 5,970,393 | A | 10/1999 | Khorrami et al. |
| 6,034,296 | A | 3/2000 | Elvin et al. |
| 6,043,644 | A | 3/2000 | de Coulon et al. |
| 6,109,783 | A | 8/2000 | Dobler et al. |
| 6,197,424 | B1 | 3/2001 | Morrison et al. |
| 6,251,488 | B1 | 6/2001 | Miller et al. |
| 6,262,550 | B1 | 7/2001 | Kliman et al. |
| 6,273,671 | B1 | 8/2001 | Ress, Jr. |
| 6,301,572 | B1 | 10/2001 | Harrison |
| 6,331,823 | B1 | 12/2001 | El-Ibiary |
| 6,343,251 | B1 | 1/2002 | Herron et al. |
| 6,512,379 | B2 | 1/2003 | Harrold et al. |
| 6,516,671 | B2 | 2/2003 | Romo et al. |
| 6,523,383 | B2 | 2/2003 | Joki et al. |
| 6,532,412 | B2 | 3/2003 | Adibhatla et al. |
| 6,556,956 | B1 | 4/2003 | Hunt |
| 6,576,861 | B2 | 6/2003 | Sampath et al. |
| 6,591,182 | B1 | 7/2003 | Cece et al. |
| 6,667,725 | B1 | 12/2003 | Simons et al. |
| 6,670,046 | B1 | 12/2003 | Xia |
| 6,717,420 | B2 | 4/2004 | Eyraud et al. |
| 6,723,379 | B2 | 4/2004 | Stark |
| 6,735,549 | B2 | 5/2004 | Ridolfo |
| 6,756,908 | B2 | 6/2004 | Gass et al. |
| 6,760,689 | B2 | 7/2004 | Follin et al. |
| 6,796,187 | B2 | 9/2004 | Srinivasan et al. |
| 6,816,817 | B1 | 11/2004 | Retlich et al. |
| 6,822,440 | B2 | 11/2004 | Machul |
| 6,831,555 | B1 | 12/2004 | Miller et al. |
| 6,838,157 | B2 * | 1/2005 | Subramanian ............... 428/173 |
| 7,270,890 | B2 * | 9/2007 | Sabol et al. ................. 428/632 |
| 2002/0170890 | A1 | 11/2002 | Keicher et al. |
| 2008/0054645 | A1 * | 3/2008 | Kulkarni et al. ............... 290/52 |

OTHER PUBLICATIONS

L. Lü, J.Y.H. Fuh, Y.S. Wong; "Laser-Induced Materials and Processes for Rapid Prototyping"; 2001; pp. 143-186; Chapter 6—Metal-Based System Via Laser Melting; Kluwer Academic Publishers; Boston, MA.

Alberto Piqué, Douglas B. Chrisey; "Direct-Write Technologies for Rapid Prototyping Applications: Sensors, Electronics, and Integrated Power Sources"; 2002; pp. 261-302; Chapter 9—Direct-Write Thermal Spraying of Multilayer Electronics and Sensor Structures; Academic Press; San Diego, CA.

V.K. Varadan and V.V. Varadan; "Microsensors, Microelectromechanical Systems (MEMS), and Electronics for Smart Structures and Systems"; 2000; pp. 953-972; Smart Mater. Struct. 9; IOP Publishing Ltd.; UK.

Run Wang, Wen H. Ko, and Darrin J. Young; "Silicon-Carbide-MESFET-Based 400° C MEMS Sensing and Data Telemetry"; IEEE Sensors Journal, vol. 5, Issue 6, Dec. 2005; pp. 1389-1394.

Rainee N. Simons, David G. Hall, Félix A. Miranda; "RF Telemetry System for an Implantable Bio-MEMS Sensor"; NASA/TM—2004-212899, Jun. 2004; 9 Pages; Hanover, MD, US.

* cited by examiner

APPARATUS AND METHOD OF MONITORING OPERATING PARAMETERS OF A GAS TURBINE

CROSS REFERENCE TO RELATED APPLICATIONS

This application is a continuation-in-part of pending U.S. patent application Ser. No. 11/122,566 filed May 5, 2005, which claims the benefit of Provisional Patent Application No. 60/581,662 filed on Jun. 21, 2004, which is also a continuation-in-part of U.S. patent application Ser. No. 11/018,816 filed Dec. 20, 2004, now U.S. Pat. No. 7,270,890 which is a continuation-in-part of U.S. patent application Ser. No. 10/252,236 filed Sep. 23, 2002, now U.S. Pat. No. 6,838,157 all of which are incorporated herein by reference.

FIELD OF THE INVENTION

The present invention relates generally to monitoring parameters of operating environments and particularly to an apparatus and method of determining wear behavior of an abradable coating system deposited on components within an operating environment such as a gas turbine engine.

BACKGROUND OF THE INVENTION

Gas combustion turbines are used for a variety of applications such as driving an electric generator in a power generating plant or propelling a ship or an aircraft. Firing temperatures in modern gas turbine engines continue to increase in response to the demand for higher efficiency engines. Superalloy materials have been developed to withstand the corrosive high temperature environment that exists within a gas turbine engine. However, even superalloy materials are not able to withstand extended exposure to the hot combustion gas of a current generation gas turbine engine without some form of cooling and/or thermal insulation.

Thermal barrier coatings are widely used for protecting various hot gas path components of a gas turbine engine. The reliability of such coatings is critical to the overall reliability of the machine. The design limits of such coatings are primarily determined by laboratory data. However, validation of thermal barrier coating behavior when subjected to the stresses and temperatures of the actual gas turbine environment is essential for a better understanding of the coating limitations. Such real world operating environment data is very difficult to obtain, particularly for components that move during the operation of the engine, such as the rotating blades of the turbine.

Despite the extreme sophistication of modern turbine engines, such as gas turbines for generating electrical power or aircraft engines for commercial and military use, designers and operators have very little information regarding the internal status of the turbine engine components during operation. This is due to the harsh operating conditions, which have prevented the use of traditional sensors for collecting reliable information of critical engine components.

Many current turbines are equipped with sensors capable of limited functions such as exhaust gas-path temperature measurements, flame detection and basic turbine operating conditions. Based on this information, turbine operators such as utility companies operate engines in a passive mode, in which maintenance is scheduled based on prior histories of similar engines. Engine rebuilds and routine maintenance are performed in the absence of a prior knowledge of the remaining or already utilized life of individual components. The lack of specific component information makes early failure detection very difficult, often with the consequence of catastrophic engine failure due to abrupt part failure. This results in inefficient utilization, unnecessary downtime and an enormous increase in operating cost.

Currently, the gas turbine industry approach is to depend on the measurement of gas path temperature, which is related back to specific component problems based on experience and history regarding a class of engines. This approach is highly subjective and only allows for determining already severe situations with an engine. It does not provide indications of impending damage or insight into the progression of events leading up to and causing engine damage due to component degradation or failure.

The instrumentation of a component such as a blade or vane within a steam turbine typically includes placing wire leads on the balance wheel, which continue on to the blade airfoil. The wire leads are typically held together by an epoxy. These wires are routed from within the component to the turbine casing. The pressure boundary of a component may be breached to introduce a sensor such as a thermocouple and a braze is back filled to hold the thermocouple in place. Each thermocouple sensor has wire leads coming out of the component that are connected back to a diagnostic unit. Instrumenting a plurality of components of a turbine in this manner results in an extensive network of wires just for monitoring the single operating condition of temperature. Instrumenting components using this technique is expensive, which is a barrier to instrumenting a large number of components within a single turbine. Further, the wire leads and data transfer is frequently poor, which can result in costly repairs and flawed data analysis.

Using thermocouples for temperature measurements in the gas path of a turbine may be disadvantageous because it only provides feedback to an operator that a temperature change has occurred in the gas path. It does not provide any indication as to why the temperature change has occurred. For diagnosing problems with blades or vanes based on a measured temperature change, there has to be an historical correlation between the measured temperature differential and the specific problem, such as a hole in a vane. This correlation is difficult and time consuming to derive to within a reasonable degree of certainty and needs to be done on an engine-by-engine basis taking into account turbine operation conditions. When a temperature differential is measured, it is difficult, if not impossible, to predict what the problem is or where it is located. Consequently, the turbine must typically be shut down and inspected to determine the scope of repair, replacement or other maintenance to be performed.

In any application, combustion turbines are routinely subject to various maintenance procedures as part of their normal operation. Diagnostic monitoring systems for gas turbines commonly include performance monitoring equipment that collects relevant trend and fault data used for diagnostic trending. In diagnostic trend analysis, certain process data (such as exhaust gas temperature, fuel flow, rotor speed and the like) that are indicative of overall gas turbine performance and/or condition are compared to a parametric baseline for the gas turbine. Any divergence of the raw trend data from the parametric baseline may be indicative of a present or future condition that requires maintenance. Such diagnostic monitoring systems can only predict or estimate specific component conditions and do not collect data from or provide any analysis with respect to the actual condition of a specific component itself.

In this respect, conventional methods of predicting component failure for gas turbines and of scheduling maintenance have not been entirely accurate or optimized. The traditional "duty cycle" used for predictive maintenance does not reflect real operational conditions, especially off-design operations. The actual life of specific components of a gas turbine depends strongly on the actual usage of that gas turbine and the specific components within the turbine.

For example, elevated temperatures and stresses within the turbine, and aggressive environmental conditions may cause excessive wear on components in the turbine beyond that predicted with the standard design duty cycle. Off-design operating conditions, which are often experienced by industrial gas turbines, are not reflected by the standard duty cycles. The actual life of components in the gas turbine may be substantially less than that predicted by the design duty cycle. Alternatively, if more favorable conditions are experienced by an actual gas turbine than are reflected in the design duty cycle, the actual component life may last substantially longer than that predicted by maintenance schedules based on the design duty cycle. In either event, the standard design duty cycle model for predicting preventive maintenance does not reliably indicate the actual wear and tear experienced by gas turbine components.

Known techniques for predicting maintenance and component replacement rely on skilled technicians to acquire or interpret data regarding the operation of a combustion turbine. Such techniques are subject to varying interpretations of that data by technicians. Technicians may manually evaluate the operational logs and/or data collected from gas turbines. Technicians, for example, may evaluate start and stop times and power settings to determine how many duty cycles had been experienced by the gas turbine, their frequency, period and other factors. In addition, if the data log of a gas turbine indicated that extraordinary conditions existed, such as excessive temperatures or stresses, the technicians may apply "maintenance factors" to quantify the severity of these off-design operational conditions.

None of these techniques provide accurate information with respect to the actual condition of a specific component or component coating, which may lead to unnecessary repair, replacement or maintenance being performed causing a significant increase in operating costs.

DETAILED DESCRIPTION OF THE INVENTION

Embodiments of the present invention may use microelectromechanical systems (MEMS) devices as sensors embedded within various types of coatings recognized by those skilled in the art. For example, barrier coating may be used herein generally to refer to a range of coatings commonly used in combustion turbine engines such as abradable coating systems, thermal barrier coatings, CMC coatings, wear coatings, protective overlay coatings, insulating coatings and restoration coatings as well as others. Reference to specific types of coatings herein is by way of example only.

Figure 1:
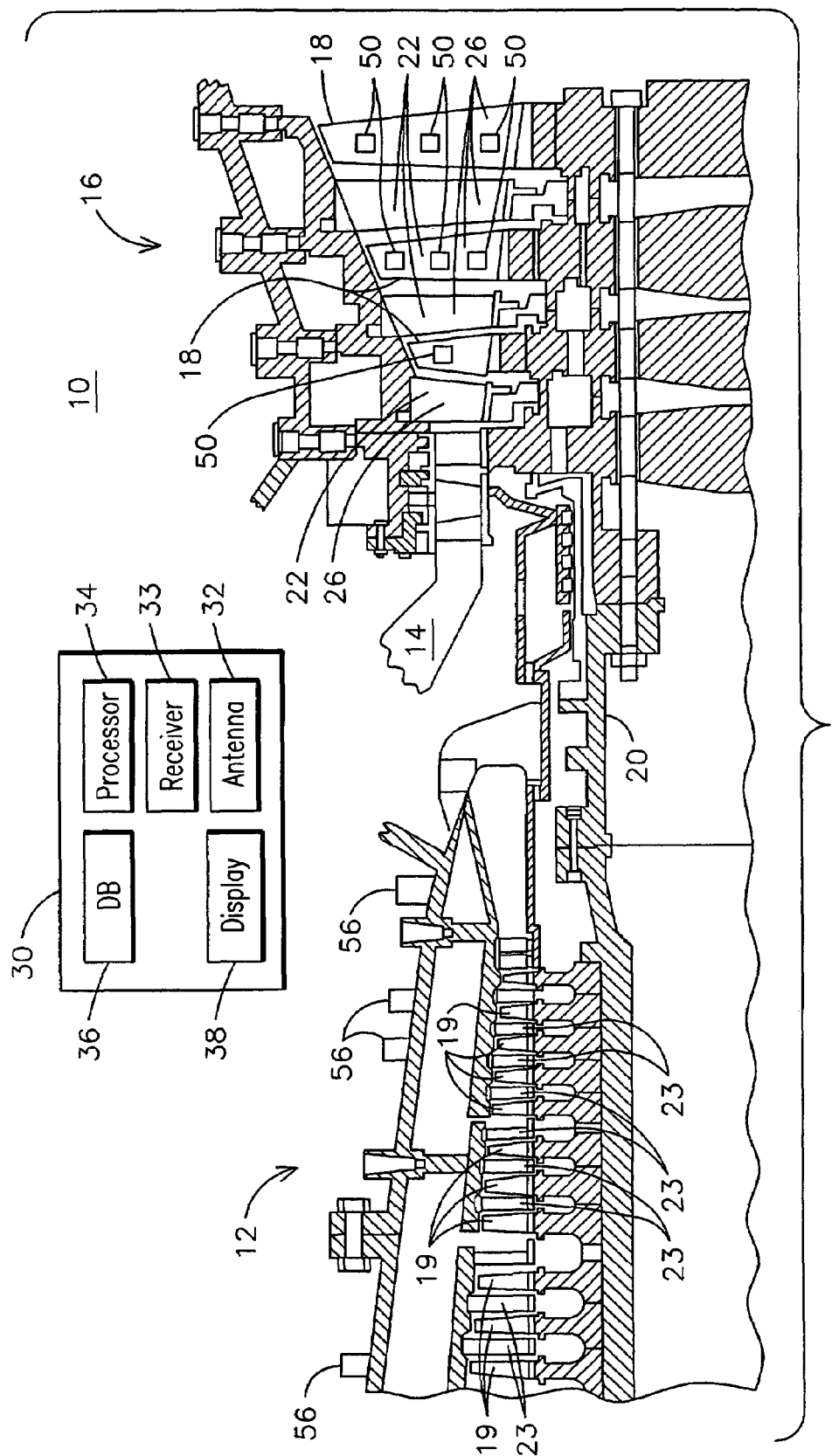
FIG. 1 is a cross sectional view of an exemplary combustion turbine with which embodiments of the invention may be used and an exemplary monitoring and control system for collecting and analyzing component data from the combustion.

MEMS devices may be embedded in barrier coatings and/or affixed on or within a surface of components to enable monitoring and diagnostics of a system such as an exemplary combustion turbine 10 of FIG. 1. Using MEMS devices is advantageous because they may be placed directly at locations of interest due to their small size and robust electrical connections. Locating MEMS devices directly at locations of interest provides an increased accuracy in measurements relative to remote sensors that are located away from the locations of interest, in which case measurements must be extrapolated to predict events at the location of interest. MEMS devices may be coupled with antenna located on their respective silicon chips for wireless transmission of data indicative of the desired properties being measured or monitored.

FIG. 1 illustrates an exemplary combustion turbine 10 such as a gas turbine used for generating electricity as will be recognized by those skilled in the art. Embodiments of the invention may be used with combustion turbine 10 or in numerous other operating environments and for various purposes as will be recognized by those skilled in the art. For example, embodiments may be used in aircraft engines, monitoring temperature and heat flux in boilers, heat exchangers and exhaust stacks; determining insulation performance and degradation; determining pipe fouling; and evaluating vibrating component health. Embodiments may be used in the automotive industry for monitoring combustion chamber conditions, rotating components such as crankshaft, cams, transmissions and differentials, and determining suspension and frame integrity for heavy-duty vehicles. Embodiments may also be used in measuring strain and heat flux in tanks, portable and other equipment operating in dessert, wet, and/or high temperature configurations.

Returning to FIG. 1, combustion turbine 10 includes a compressor 12, at least one combustor 14 (broken away) and a turbine 16. Compressor 12, combustor 14 and turbine 16 are sometimes referred to collectively as a gas turbine engine. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel-cobalt, and may be coated with a thermal barrier coating 26, such as yttria-stabilized zirconia. Similarly, compressor 12 includes a plurality of rotating blades 19 positioned between respective vanes 23.

In use, air is drawn in through compressor 12, where it is compressed and driven towards combustor 14. Combustor 14 mixes the air with fuel and ignites it thereby forming a working gas. This working gas will typically be above 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example steam or compressed air, to blades 18 and vanes 22.

The environment wherein blades 18 and vanes 22 operate is subject to high operating temperatures and is particularly harsh, which may result in serious deterioration of blades 18 and vanes 22. This is especially likely if the thermal barrier coating 26 should spall or otherwise deteriorate. Embodiments of the invention are advantageous because they allow components to be configured for transmitting data indicative of a component's condition during operation of combustion turbine 10. Blades 18, 19, vanes 22, 23, and coatings 26, for example, may be configured for transmitting component specific data that may be directly monitored to determine the respective condition of each component during operation and to develop predictive maintenance schedules.

FIG. 1 also illustrates a schematic of an exemplary monitoring and control system 30 that may be used in accordance with various aspects of the present invention. System 30 may include an antenna 32, a receiver 33, a processor or CPU 34, a database 36 and a display 38. Processor 34, database 36 and display 38 may be conventional components and antenna 32 and receiver 33 may have performance specifications that are a function of various embodiments of the invention. For example, antenna 32 and receiver 33 may be selected for receiving wireless telemetry data transmitted from a plurality of transmitters deployed in various locations throughout combustion turbine 10 as more fully described below.

Embodiments of the present invention allow for a plurality of MEMS sensors to be embedded within the respective coatings of a plurality of components within combustion turbine 10. Alternate embodiments allow for the sensors to be surface mounted or deposited to components, especially those contained in areas where components do not require a barrier coating such as the compressor. Exemplary embodiments of sensors may be used to provide data to system 30 with respect to physical characteristics of a component and/or properties of a component's coating as well as other component or coating specific information.

For example, exemplary sensors may be used to detect wear between two components, measure heat flux across a component's coating, detect spalling of a coating, measure strain across an area of a component or determine crack formation within a component or coating. MEMS sensors may be configured as proximity probes, accelerometers, load cells, pressure transducers, strain gauges, temperature probes, heat flux sensors, vibration sensors and gas sensors. Those skilled in the art will recognize other properties and/or characteristics of a component, component coatings and operating parameters of combustion turbine 10 that may be monitored, measured and/or detected in accordance with aspects of the invention.

It will be appreciated that aspects of the invention allow for various MEMS sensor configurations to be embedded within a barrier coating such as a barrier coating 26 of blades 18 or vanes 22 of turbine 16. U.S. Pat. No. 6,838,157, which is specifically incorporated herein by reference, describes various embodiments of methods for instrumenting gas turbine components, such as blades 18 and vanes 22 that may be utilized for depositing MEMS sensors in accordance with aspects of the present invention. This patent discloses various methods of forming trenches in a barrier coating, forming a sensor in the coating and depositing a backfill material in the trench over the coating. Embodiments of those methods and components may be used to form smart components incorporating MEMS sensors as disclosed herein.

U.S. Pat. No. 6,576,861, which is specifically incorporated herein by reference, discloses a method and apparatus that may be used to deposit embodiments of sensors and sensor connectors with transmitters in accordance with aspects of the present invention. In this respect, methods and apparatus disclosed therein may be used for the patterning of fine sensor and/or connector features of between about 100 microns and 500 microns without the need of using masks. Multilayer electrical circuits and sensors may be formed by depositing features using conductive materials, resistive materials, dielectric materials, insulative materials and other application specific materials. It will be appreciated that other methods may be used to deposit multilayer electrical circuits and sensors in accordance with aspects of the invention. For example, thermal spraying, vapor deposition, laser sintering and curing deposits of material sprayed at lower temperatures may be used as well as other suitable techniques recognized by those skilled in the art.

Embodiments of the invention allow for a plurality of sensors 50, which may be MEMS devices to be deployed in numerous places within combustion turbine 10 for monitoring component-specific or coating-specific conditions as well as collecting other data with respect to the operation or performance of combustion turbine 10. For example, FIG. 1 illustrates that one or more sensors 50 may be embedded within respective barrier coatings 26 of one or more blades 18 of turbine 16. It will be appreciated that sensors 50 may be embedded within barrier coatings of other components with turbine 16 for which component-specific and/or coating-specific data is to be acquired.

Figure 2:
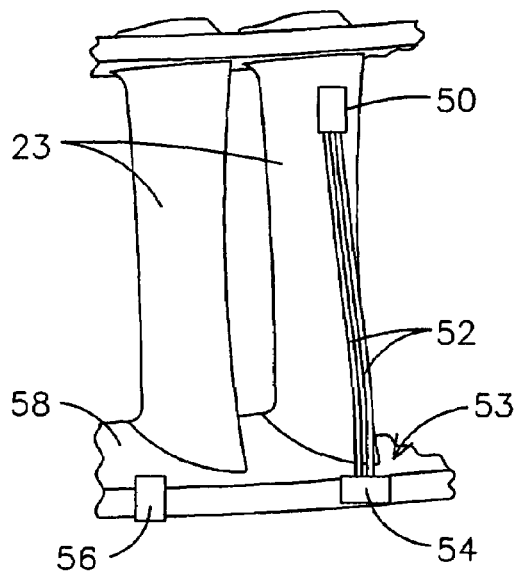
FIG. 2 a perspective view of an exemplary combustion turbine vane equipped with an exemplary embodiment of the present invention.

FIG. 2 illustrates a pair of vanes 23 removed from compressor 12 with one vane having a sensor 50 mounted or connected with vane 23 for detecting a condition of vane 23. A connector 52 may be provided for as a means for routing a data signal from sensor 50 to a transmitter 54 configured for wirelessly transmitting the data signal to a transceiver 56. Connector 52 may be one or a plurality of electrical leads for conducting a signal from sensor 50 to a surface mounted transmitter 54. Alternate embodiments allow for various types of connectors 52 to be used as a means for routing a data signal from sensor 50 to transmitter 54, depending on the specific application. For example, one or a plurality of fiber optic connectors may be used for routing a signal using single or varying wavelengths of light.

Embodiments allow for transmitters 54 to be multi-channel and have various specifications depending on their location within a casing of combustion turbine 10. Transmitters 54 may be configured to function within the compressor 12 casing subject to operating temperatures of between about 80° C. to 120° C. They may also be configured to function within the turbine 12 casing subject to operating temperatures of between about 300° C. to 350° C. of higher, and be resistant to oxidative exposure.

Figure 3:
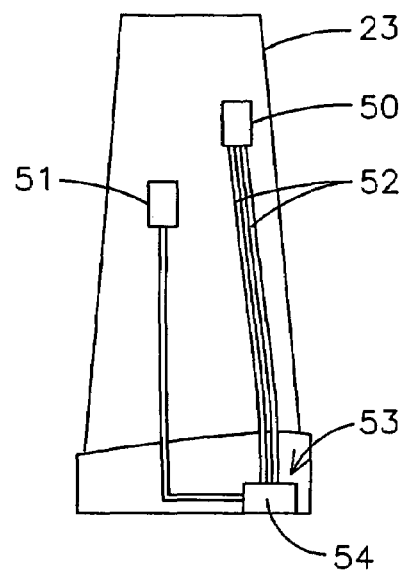
FIG. 3 is a schematic view of a vane of FIG. 2.

FIG. 3 illustrates a schematic plan view of compressor vane 23 having sensor 50 connected therewith and connector 52 connecting sensor 50 with transmitter 54. A power source 51 may be provided, such as an appropriately sized battery for powering transmitter 54. In alternate embodiments transmitter 54 may be located remotely from vane 23 and powered from an external power source. Transmitter 54 may receive signals from sensor 50 via connector 52 that are subsequently wirelessly transmitted to transceiver 56. Transceiver 56 may be mounted on hub 58 or on a surface external to compressor 12 such as the exemplary locations shown in FIG. 1. Transceiver 56 may be mounted in various locations provided it is within sufficient proximity to transmitter 54 to receive a wireless data transmission, such as an RF signal from transmitter 54. Transceiver 56 may transmit the RF signal to antenna 32 of system 30 where the signal may be processed for monitoring the condition of compressor vane 23.

With respect to FIGS. 2 and 3, one or more sensors 50 may be connected with one or more compressor vanes 23 by fabricating sensor 50 directly onto a surface of vane 23. Connector 52 may be deposited directly onto a surface of vane 23. In alternate embodiments a trench or recess may be formed within a surface of vane 23 that is sized for receiving a deposited sensor 50 and connector 52. Sensor 50 and connector 52 may be deposited within the recess and protected by depositing a coating of suitable material onto a surface of vane 23 over sensor 50 and connector 52. In other alternate embodiments a coating may be deposited onto a surface of vane 23, a trench may be formed within the coating and sensor 50 and connector 52 may be deposited within the trench. A protective coating may be deposited over sensor 50 and/or connector 52.

Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23.

Figure 4:
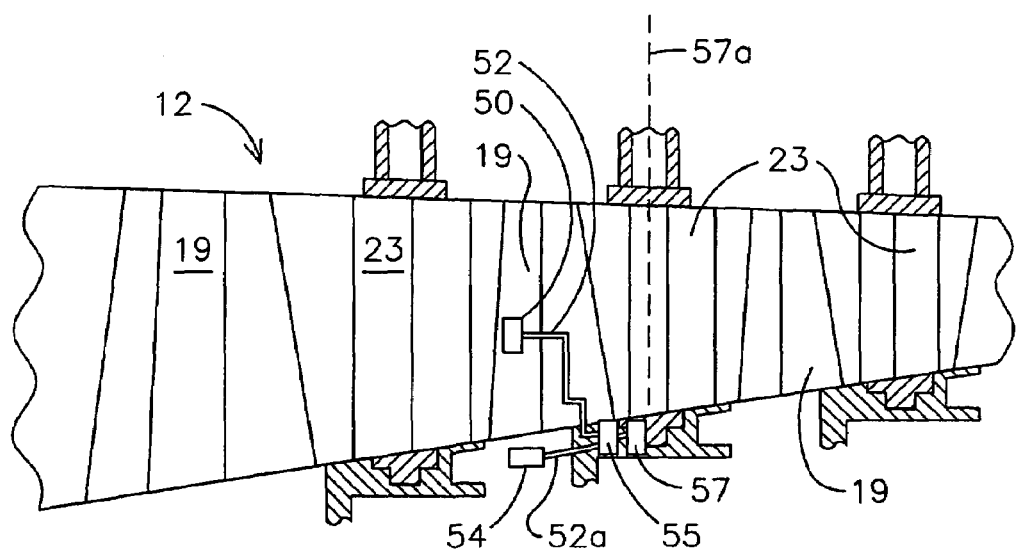
FIG. 4 is a schematic cross section of the compressor of FIG. 1.

In an embodiment, one or more sensors 50, such as strain gauges or thermocouples, for example, may be deposited on one or more turbine or compressor blades 18, 19. FIG. 4 illustrates an embodiment with respect to compressor 12. A connector 52 may be deposited to connect each sensor 50 to one or more transmitters 54 connected with blade 18, 19. It will be appreciated that exemplary embodiments allow for a plurality of sensors 50 to be connected with a single transmitter 54 via respective connectors 52. For example, a sensor 50 may be deposited on each of a plurality of blades 18, 19. A connector 52 may be deposited to route a signal from each sensor 50 to a single transmitter 54.

Transmitter 54 and a rotating antenna 55 may be mounted proximate the root of blade 18, 19. Connector 52 may be routed from sensor 50 aft to the root of blade 18, 19 to connect sensor 50 with rotating antenna 55, which may in turn be connected with transmitter 54 via a connector 52a. A stationary antenna 57 may be installed on a turbine or compressor vane 22, 23 aft of the root of respective blade 18, 19. A lead wire 57a may be routed from stationary antenna 57 out of compressor 12 or turbine 16 to broadcast a signal to system 30. In exemplary embodiments, such as that shown in FIG. 4, power may be generated through induction during operation of compressor 12 as will be appreciated by those skilled in the art. In this arrangement, transmitter 54 may transmit data to stationary antenna 57 via rotating antenna 55 and power may be supplied from stationary antenna 57 to transmitter 54.

It will be appreciated by those skilled in the art that one or more sensors 50 may be mounted to, such as by a spray deposition, each compressor blade 19 within a row of blades 19 mounted on a disk within compressor 12. A respective connector 52 may connect each sensor 50 to a respective transmitter 54 mounted proximate the root of each blade 19 within the row. Rotating antenna 55 may encircle the disk proximate the root of each blade 19 and be connected with each transmitter 54 via a respective connector 52a. One or more stationary antennas 57 may be installed on a compressor vane 23 aft of the row of compressor blades 19, or in another location, such as a compressor hub sufficiently proximate to rotating antenna 55 for signal broadcasting and receiving. Stationary antenna 57 may also encircle the row of blades 19. Rows of blades 18 in turbine 16 may be similarly configured.

Figure 5:
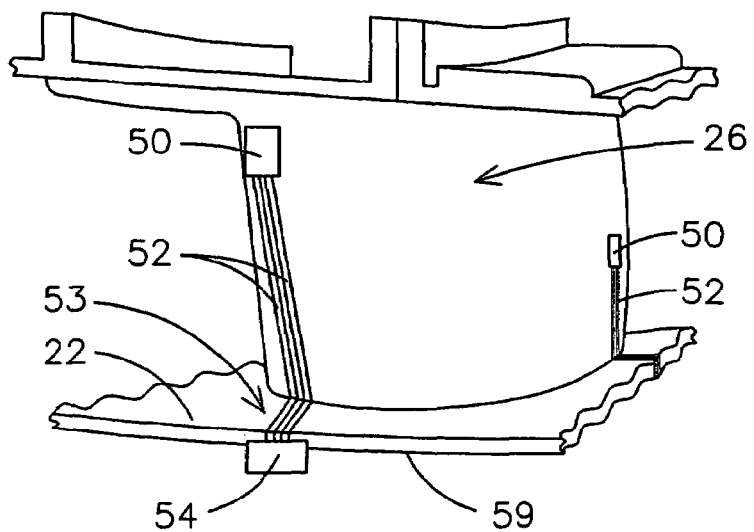
FIG. 5 is a perspective partial view of an exemplary embodiment of a smart component combustion in accordance with aspects of the invention.

FIG. 5 illustrates a partial view of a component, such as a vane 22 from turbine 16 having a barrier coating 26 deposited thereon. Sensor 50 and connector 52 may be embedded beneath an upper surface of barrier coating 26. Connector 52 may have a distal end 53 that is exposed at a termination location, such as proximate a peripheral edge 59 of vane 22 for connection with transmitter 54. In an embodiment transmitter 54 may be surface mounted to vane 22 or embedded within coating 26 proximate peripheral edge 59. Alternate embodiments allow for transmitter 54 to be located elsewhere such as on a platform (not shown) to which vane 22 is connected or in a cooling flow channel, for example, as will be recognized by those skilled in the art.

Figure 6A:
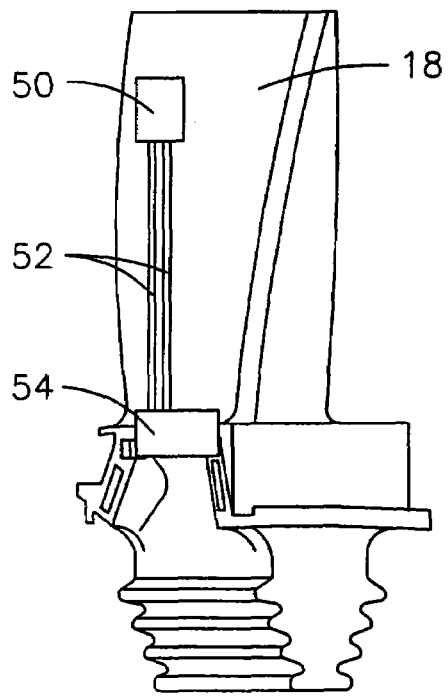
FIG. 6A is a schematic view of an exemplary embodiment of the component of FIG. 5.
Figure 6B:
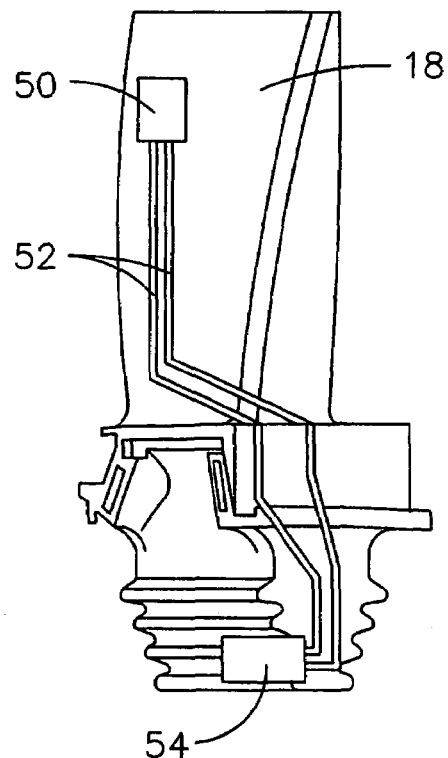
FIG. 6B is a schematic view of an exemplary embodiment of the component of FIG. 5.
Figure 6C:
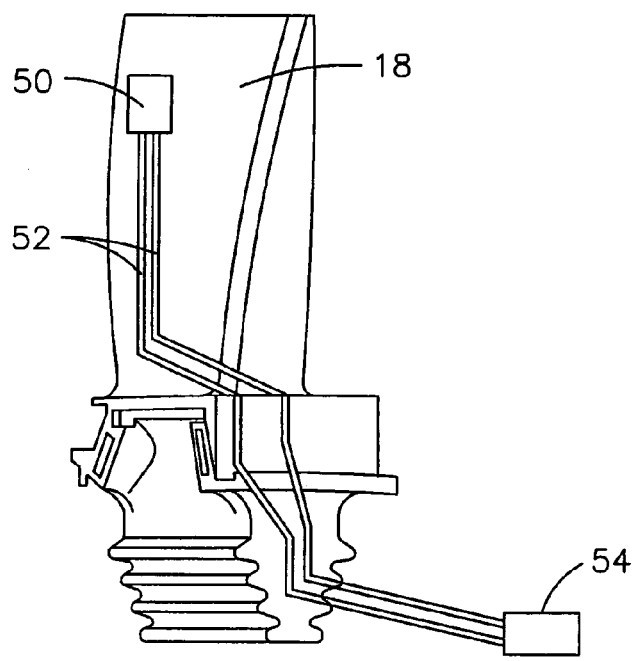
FIG. 6C is a schematic view of an exemplary embodiment of the component of FIG. 5.

FIG. 6A illustrates a schematic plan view of a blade 18 having an exemplary sensor 50 connected therewith and connector 52 connecting sensor 50 with transmitter 54. Transmitter 54 may be powered through induction generated within turbine 16 during operation that will be appreciated by those skilled in the art. FIGS. 6A, 6B and 6C illustrate exemplary embodiments of a turbine blade 18 having transmitter 54 placed in various locations. In FIGS. 6A and 6B transmitter 54 may be mounted to blade 18 and FIG. 5C illustrates that transmitter 54 may be located remote from blade 18. For example, transmitter 54 may be located remotely from blade 18 such as within a disk (not shown) to which a plurality of blades 18 is attached. In this respect, transmitter 54 may be maintained in a cooler location outside the hot gas path, which may increase the transmitter's useful life. Locating transmitter 54 remote from blade 18 allows for using an external power source for powering transmitter 54 rather than using a battery or induction.

A power supply may also be attached to sensor 50 to provide additional functionality to the sensor. This additional functionality could include mechanical actuation as a result of feedback to the sensor 50 output. Such an integrated system may be applicable for components, such as ring segments for real-time gap control.

The exemplary embodiments of compressor vane 23 and turbine blade 18 illustrated in FIGS. 3-6A, 6B and 6C configured with self-contained sensors 50 and connectors 52 are advantageous in that they may be prefabricated for installation in combustion turbine 10 by a field technician. Embodiments allow for a distal end 53 of connectors 52 to be exposed at a termination location. This location may be proximate a peripheral edge of a component or other location. This allows a field technician to quickly and easily connect connector 52 to a transmitter 54 regardless of its location.

Providing components of combustion turbine 10, such as vanes 23 and/or blades 18 with pre-installed sensors 50 and connectors 52 is a significant advantage over previous techniques for installing such components in the field, which typically required an extensive array of wires to be routed within combustion turbine 16. Providing components with pre-installed sensors 50 and connectors 52 allows for monitoring the condition of those specific components during operation of combustion turbine 10.

Embodiments of the invention allow for sensor 50 to be configured to perform a wide range of functions. For example, sensor 50 may be configured to detect wear of a single component or between two components, measure heat flux across a component's coating, detect spalling of a coating, measure strain across an area of a component or determine crack formation within a component or coating. U.S. patent application having application Ser. No. 11/018,816 discloses embodiments of a system that generally involves monitoring the wear of a component that may be configured in accordance with embodiments of the present invention.

Wear sensors 50 may be configured as embedded electrical circuits in a contact surface of a component, such as a tip of blade 18 and the circuit may be monitored by monitoring system 30 for indications of wear. By positioning a circuit at the wear limit, or at prescribed depths from the component's surface, the condition of the surface may be continuously monitored and system 30 may provide an operator with an advanced warning of service requirements.

It will be appreciated that sensor 50 may be configured for wear detection and prefabricated within a component for use within combustion turbine 10 either alone or in combination with a means for transmitting 52 in accordance with aspects of the present invention. In this respect, the signals extracted for detection of wear may be conducted via connectors 52 to transmitter 54, which may transmit the signals via wireless telemetry to a transceiver 56 and subsequently system 30.

Embodiments of the present invention allow for monitoring and control system 30 to collect and store historical data with respect to a component's wear and correlating the component's wear with the operating conditions of combustion turbine 10 responsible for producing the wear. This may be accomplished by continuously interrogating turbine 16 conditions, for example, by the deposition of piezoelectric devices and/or other sensors 50 configured for providing a continuous data stream indicative of the loading conditions and vibration frequency experienced by various components within turbine 16. This data may be correlated to data indicative of a component's wear and used for predictive maintenance or other corrective actions.

Figure 7:
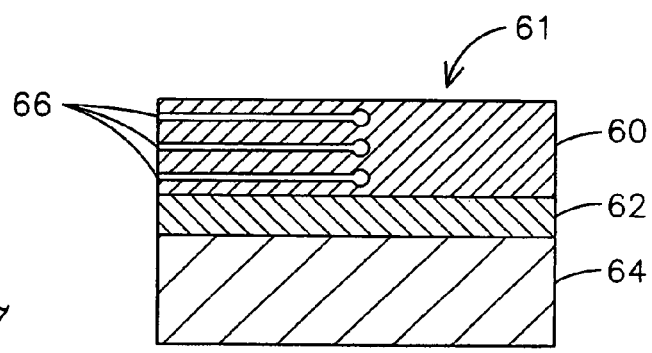
FIG. 7 is an exemplary embodiment of a heat flux sensor.

FIG. 7 illustrates another exemplary embodiment of a sensor 50 that may be configured as an exemplary heat flux sensor 61 for measuring heat flux across a barrier coating such as a thermal barrier coating (TBC) 60, which may be yttrium-stabilized zirconium. Using known techniques, thermal barrier coating 60 may be deposited on a bond coat 62, which may be deposited on a substrate 64. Substrate 64 may be various components such as a superalloy suitable for use in turbine 16, and in an embodiment may be a blade 18. The heat flux may be used to obtain the surface temperature of substrate 64 without having to expose the surface of substrate 64 to the surface temperature experienced by the upper surface of thermal barrier coating 60.

Thermocouples 66 may comprise a material having a coefficient of thermal expansion that substantially matches that of the material within which they are deposited, such as thermal barrier coating 60. In an embodiment, a plurality of temperature sensors, such as K-type thermocouples 66 may be embedded within a thermal barrier coating 60 with thermocouples 66 located vertically over each other as shown in FIG. 6. In an embodiment, thermocouples 66 may include a NiCr/NiAl thermocouple junction. Alternate embodiments allow for thermocouples 66 to be fabricated of other materials such as Pt and Pt—Rh for high temperature applications such as those within turbine 16.

Heat flux sensor 61 may be formed in different geometries to achieve a desired signal-to-noise ratio. Each thermocouple 66 may be approximately 25 microns thick but this thickness may vary depending on the application. Because the thermal barrier coating 60 may be several times as thick as thermocouples 66 they will not significantly alter the profile or performance of thermal barrier coating 60. Embodiments allow for post deposition laser micromachining to achieve a desired junction density.

As heat flows vertically into or out of thermal barrier coating 60, each thermocouple 66 will record a different temperature measurement. By measuring the temperature differences and knowing the thickness and thermal conductivity of thermal barrier coating 60, the heat flux can be obtained. Thermocouples 66 may be connected with a means for transmitting 52 as described herein so that the respective temperature measurements taken by each thermocouple 66 may be wirelessly transmitted to monitoring and control system 30.

Figure 8:
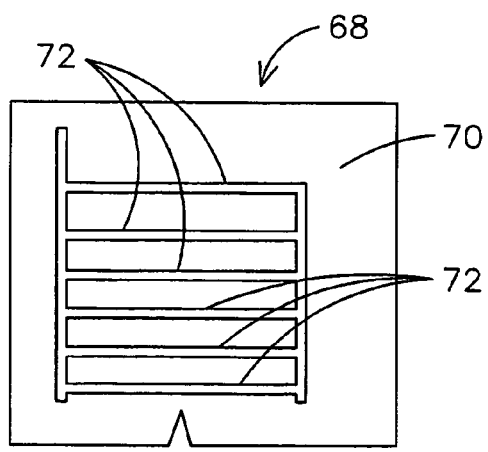
FIGS. 8 and 9 illustrate an exemplary embodiment of a strain gauge and a crack propagating to different lengths.
Figure 9:
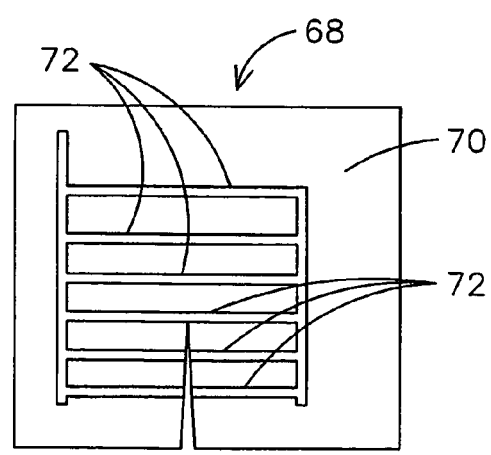

FIGS. 8 and 9 illustrate an exemplary embodiment of a sensor 50 that may be configured as an exemplary sensor 68 configured for detecting and/or measuring strain or a crack within a location of interest such as substrate 70. For example, substrate 70 may be a location of interest of a surface area of a blade 18, or it may be other locations of interest within or at the surface of thermal barrier coating 60 or bond coat 62. It will be appreciated that sensor 68 configured in this manner may be used in numerous places throughout combustion turbine 10. The sensors described in FIGS. 8 and 9 describe the utilization of the change in resistance to result in a strain output. Other embodiments of strain gauges could also include capacitive changes to determine the local strain values.

In this respect, critical engineering components, such as blades 18, 19 and vanes 22, 23 are nearly universally subjected to some form of mechanical and/or thermo-mechanical cyclic loading. Aspects of the invention allow for the assessment of component service life by the intermittent or continuous, in-situ measurement of applied strains and crack detection with respect to that component. This may be accomplished by the placement of embedded strain gages and crack sensors 68 in various locations within combustion turbine 10. Sensors 50 configured as a strain gauge 68 may be formed using a NiCr material for use in lower temperature applications, such as in compressor 12 of combustion turbine 10.

Sensors 68 may be used as crack sensors by placing them at locations or points where cracks are known or likely to appear. A crack sensor gauge 68 may be optimized for size, crack propagation, and crack extent through appropriate choice of gauge 68 parameters. Such parameters may include the footprint of gauge 68, spacing of fingers 72, and orientation of fingers 72 with respect to the direction of a predicted crack propagation. Crack formation in substrate 70 gives rise to a large, abrupt change in the strain gauge response, and may be detected by continuously monitoring the sensor 68 output for abrupt signal changes using known signal processing techniques. Data indicative of the signal change may be conducted via a means for transmitting 54 to a transceiver 56 and subsequently transmitted to monitoring and control system 30 via wireless telemetry.

In an exemplary embodiment, a strain gauge sensor 68 may be bonded to or deposited on a surface of a compressor blade 19 and positioned so that bending stress on blade 19 varies the output signal from sensor 68. Connector 52, which may be wire leads, are routed to a transmitter 54 located on a rotating collar internal to compressor 12. Transmitter 54 may have an onboard bridge completion and provide a regulated voltage to sensor 68. As the output signal from sensor 68 varies an RF signal from transmitter 54 varies proportionally. The RF signal may be transmitted to a transceiver 56, which receives the RF signal and converts it into a voltage signal proportional to the strain detected by sensor 68. The RF signal may be transmitted to system 30. An exemplary transmitter 54 may pick up changes in strain from about 30 Hz to about 30 KHz.

Embodiments of the invention allow for using crack sensors 68 to monitor crack growth during operation of combustion turbine 10 and verify design models by varying component operating parameters until cracks are detected with the crack sensors 68. The design models will be calculated for the same operating parameters to see if they successfully predict crack growth and formation, and will be modified accordingly.

Monitoring and control system 30 may collect and store data indicative of strain and crack measurements from numerous components in critical locations within combustion turbine 10, such as blades 18, for example. Such data may be analyzed over time to develop a strain history for each component. A component's strain history may include the magnitude and orientation of strains, and the occurrence of overloads under cyclic loading. An appraisal of fatigue damage may be developed and used for predictive maintenance.

Embodiments of the present invention allow for deploying a plurality of sensors 50 throughout combustion turbine 10 by either surface mounting them to components or embedding them within respective component barrier coatings to collect specific component condition data and transmit that data using wireless telemetry to monitoring and control system 30. This approach is advantageous in that it allows for the replacement, repair and maintenance decision-making processes to be based on the condition of specific components during operation of combustion turbine 10.

In this respect, specific component condition data may be received by antenna 32 and receiver 33 then stored in database 36 by CPU 34. Embodiments allow for specific component condition data to be collected and presented to an operator in real time via display 38. This allows for an operator to make instantaneous decisions regarding the operation of combustion turbine 10 in response to the condition of a specific component or components.

Historical data may be compiled and analyzed with respect to each component for making repair, replacement or maintenance decisions with respect to that component. Operating conditions and specific components of combustion turbine 12 may be monitored sets of conditions may be isolated that are indicative of a component or components needing to be repaired or replaced, or of corrective action to be taken with respect to operation of the gas turbine. These aspects allow for significant improvement in predictive maintenance schedules.

Figure 10:
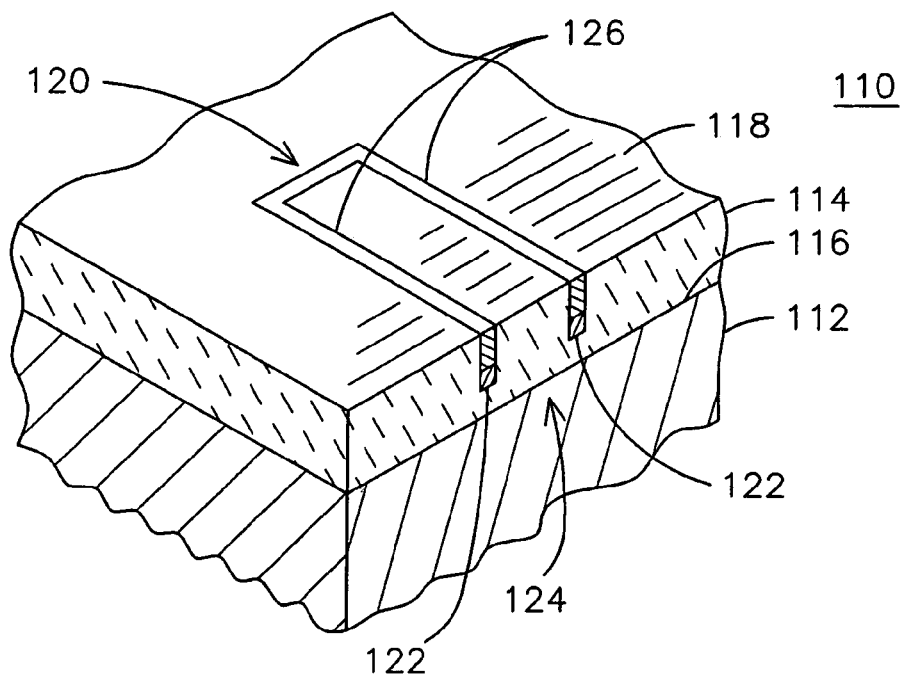
FIG. 10 is a partial perspective view of a component having a sensor embedded within a layer of thermal barrier coating material disposed over a substrate material.

FIG. 10 is a partial perspective illustration of a component 110 formed of a substrate material 112 having a barrier coating such as a layer of thermal barrier coating 114 disposed on one surface 116. The component 110 may be part of a gas turbine engine 10 of FIG. 1, for example, or any other machine wherein a base material must be protected from an external environment by a layer of a barrier material. In an embodiment, component 110 may be an airfoil member, such as a turbine blade 18 disposed in the hot gas flow path of a engine 10 with an oxide or non-oxide ceramic TBC 14 such as mullite, silicon carbide or a zirconium-based ceramic overlying a superalloy substrate material 112.

Component 110 may alternatively be fabricated from a ceramic matrix composite (CMC) substrate coated with an environmental barrier coating (EBC) or a thermal barrier coating (TBC). Because the integrity of the coating 114 is critical to the overall integrity of the component 110, it is useful to obtain operating parameter information that directly affects the performance of the coating 114. Such information is obtained by embedding a sensor, such as a sensor 50 below the exposed surface 118 of the TBC 114. The sensor is not visible in FIG. 10 but may be located below surface 118 in the sensing location indicated generally by numeral 120.

The sensor may be one that provides a signal indicative of temperature, strain, crack initiation, chemical changes, vibration, pressure or other parameters of interest. These sensors themselves could be multi-layered containing a combination of electrodes and the functional body. Conductors 122 may also be located below surface 118 may route the signal produced by the sensor away from sensing location 120 to a termination location, which may be a connection location indicated generally by numeral 224 where they can conveniently exit the component 110. Conductors 122 may function similarly to connectors 52 for routing a signal from a sensor, such as a sensor 50 to a transmitter 54 for transmission to system 30 via wireless telemetry. The sensor and the conductors 122 may be insulated from the surrounding environment by a layer of insulating material 126.

Figure 11:
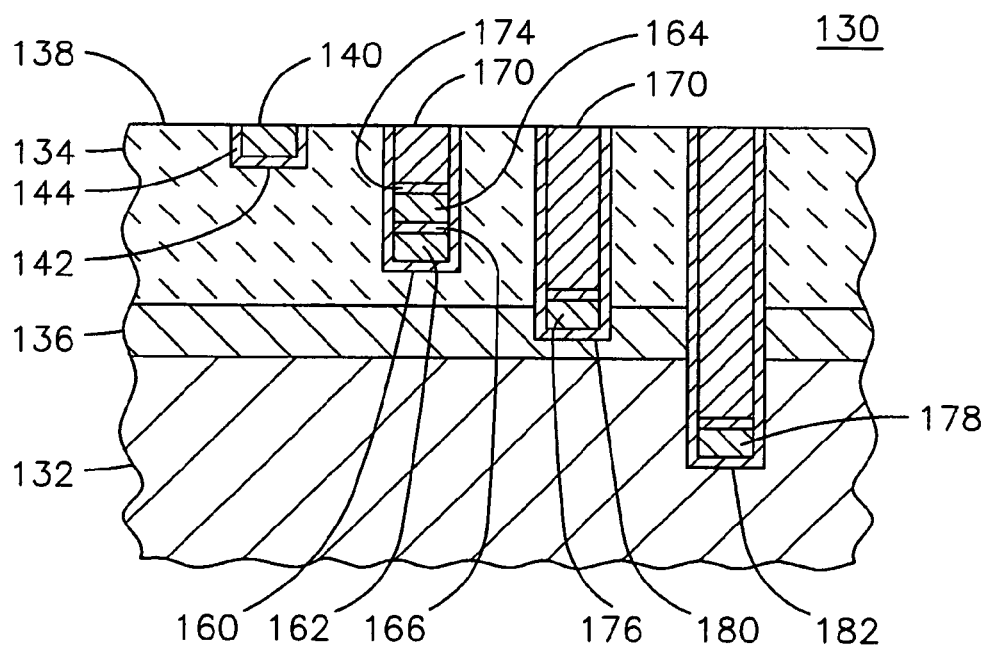
FIG. 11 is a partial cross-sectional view of a component having a plurality of sensors embedded at varying depths below a surface of the component.

FIG. 11 is a partial cross-sectional view of another component 130 having a substrate material 132 covered by a barrier coating such as a layer of a thermal barrier coating material 134 for use in a very high temperature environment. As is well known in the art of TBC coatings, a bond coat 136 such as an MCrAlY material may be deposited on the substrate 132 prior to the application of the TBC material 134 to improve the adherence of the coating 134 to the substrate 132.

Component 130 may be instrumented by a plurality of sensors, such as sensors 50 embedded at a plurality of depths below a surface 138 of the TBC material 134 that is exposed to the external environment. A first sensor 140 is deposited in a relatively shallow trench 142. Trench 142 may be lined with an electrically insulating coating 144 such as aluminum oxide to prevent the grounding of sensor 140 to the TBC material 134. Sensor 140 may take any form known in the art, for example a thermocouple formed by a bimetallic thermocouple junction or other sensors described herein. The surface location of sensor 140 suggests that it may be useful for sensing a parameter related to the external environment, such as temperature or a chemical parameter.

Figure 12:
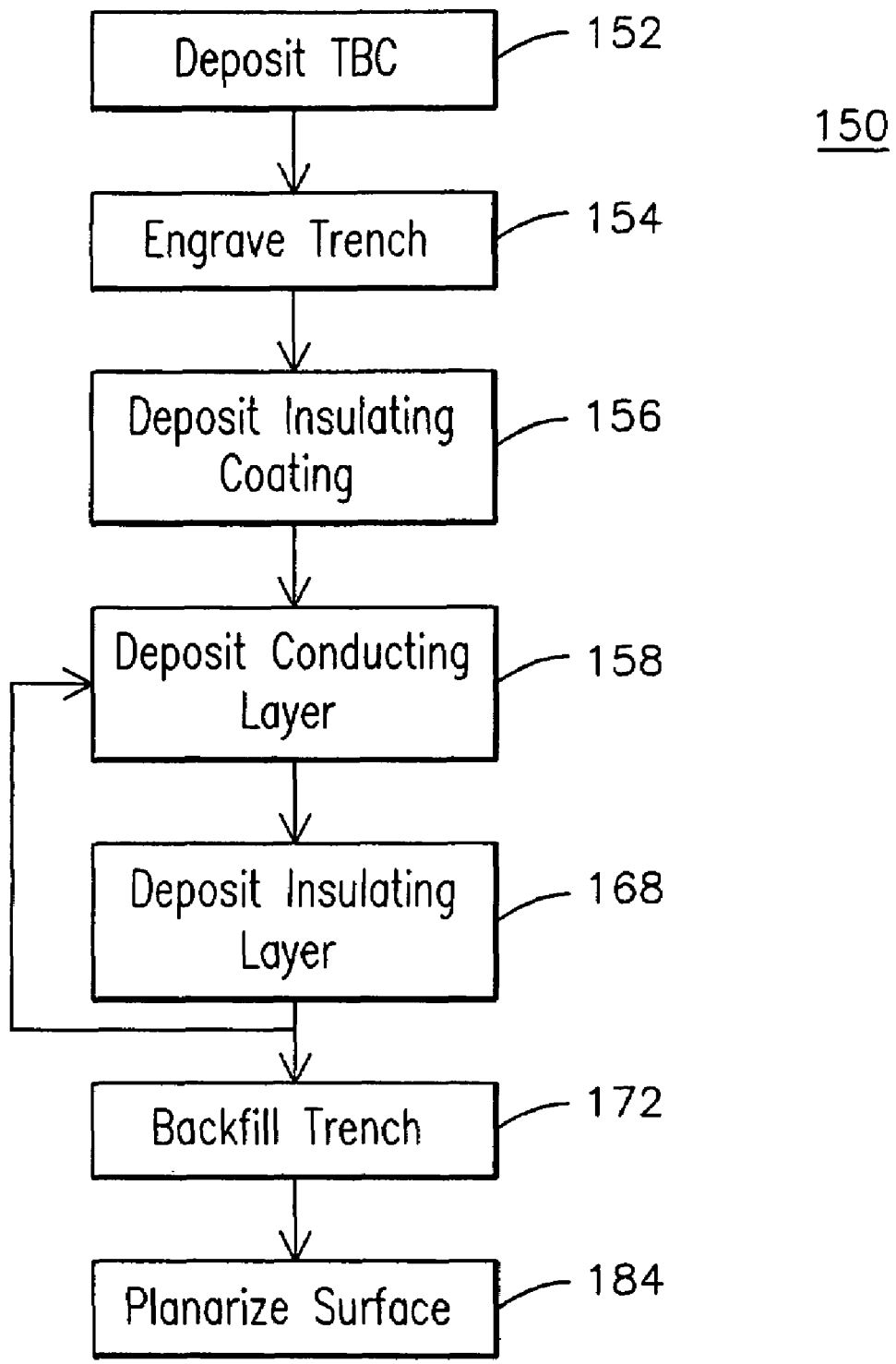
FIG. 12 is a process diagram illustrating steps in a method of manufacturing the component of FIG. 11.

FIG. 12 illustrates the steps of a process 150 that may be used during the manufacturing of the component 130 of FIG. 11. In step 152, a layer of thermal barrier coating material 134 may be deposited onto a substrate 132. After step 152, the component is completed in its normal operating shape as it may be used without embedded instrumentation. One skilled in the art may appreciate, therefore, that the process 150 may be applied to newly fabricated components or it may be back fit to an existing component that is in inventory or that has been in service.

In step 154, a trench 142 may be formed in a surface 138 of the component 130. Trench 142 may be formed to any desired shape by any known method, such as by laser engraving trench 142 to have a generally rectangular cross-section with a predetermined width and depth. Variables for such a laser engraving process include spot size, power level, energy density, pulse frequency, and scan speed. These variables together affect the trench width, depth, material removal rate and the cost of manufacturing. Trench 142 may have a constant cross-sectional size and shape along its entire length, or it may vary in size and/or shape from one region to another. For example, in the component 110 of FIG. 10, a trench formed in the sensing location 120 may have different dimensions than the trench extending from the sensing location 120 to the connecting location 124, since the sensor and the conductors 122 may have different geometries. The trench 142 may also be inclined to the surface, i.e. varying in depth along its length, which in some applications may provide improved mechanical integrity within the component.

After trench 142 is formed at step 154, an insulating coating 144 may be applied to the surfaces of the trench 142 at step 56 in order to provide electrical isolation between sensor 140 and TBC material 134. Insulating coating 144 may be deposited by any known method such as chemical vapor deposition (CVD) to a thickness sufficient to achieve a desired level of electrical isolation. Once the trench 142 is formed at step 154 and insulated at step 156, the sensor 140 may be formed by depositing the appropriate material or materials into trench 142 at step 158. Any known material deposition process providing the desired material properties may be used. Such processes are common in the fields of rapid prototyping, thin and thick film deposition, and thermal spraying, and include, for example, chemical vapor deposition, plasma spray, microplasma spray, cold spray, electroplating, electrophoretic deposition, HVOF, sputtering, CCVD, sol-gel and selective laser melting. Processes typically used for the fabrication of multi-layer thick film capacitors may also be used, such as the application of pastes and tapes of the desired materials.

After the deposition of material, a heat input may be used to sinter the material, thereby increasing the mechanical integrity of the sensor. This can be done either by heating using a flame, plasma, furnace annealing or localized laser energy application. In the selective laser melting (SLM) process, powdered material having a predetermined chemistry may be deposited into the trench and melted with the energy of a laser beam to form the respective portion of the sensor 140 of FIG. 11 or the interconnecting conductors 122 of FIG. 10. For example, to form a thermocouple, platinum powder may be deposited into one portion of trench 142 and solidified by a SLM process. Platinum-rhodium powder may then be deposited into a second portion of trench 142, either along the trench length or as a second vertical layer, and solidified by a SLM process to contact the platinum material to form the thermocouple junction.

Note that the geometry of trench 142 may have a direct effect on the geometry of the sensor 140. Accordingly, it is possible to affect the operating parameters of sensor 140 or interconnecting conductors 122 by controlling the dimensions of the respective trench 142. For example, the resistance of a conducting line formed within a trench will be affected by the width of the trench. The laser engraving process of step 154 may be closely controlled to achieve a desired trench geometry. Certain commercially available processes for depositing a conductor onto a flat surface by thermal spraying may not produce the fine features that may be necessary for sensors and conductive lines. Such processes may rely on a subsequent material ablation process to achieve a desired geometry. Because trench 142 provides control of the width of the feature, no such trimming step is needed in the process 150 of FIG. 12.

FIG. 11 also illustrates a second trench 160 formed in the TBC material 134 to a second depth that is farther below surface 138 than trench 142. By forming a plurality of trenches 142, 160 at a plurality of depths below surface 138, it is possible to place sensors, such as sensors 50 at more than one depth within the component 130, thereby further augmenting the available operating parameter data. In the embodiment of FIG. 11, trench 160 contains two vertically stacked conducting layers 162, 164 separated by an insulating layer 166. The conducting layers 162, 164 may form two portions of a sensor, or two conducting lines for connecting a sensor to a connecting location. 1 As illustrated in FIG. 12, the two conducting layers 162, 164 may be formed by first depositing conducting layer 162 at step 158, and then depositing an insulating layer 166 at step 168 using any desired deposition technique, such as CVD.

Steps 158, 168 are then repeated to deposit conducting layer 164 and insulating layer 174. The width of these layers is controlled by the width of trench 160 and the thickness of these layers may be controlled as they are deposited to achieve predetermined performance characteristics. For example, the thickness of insulating material 166 will affect the impedance between the two conducting layers 162, 164. Conducting layer 164 is then isolated from the external environment by backfilling the trench 160 with a barrier material such as thermally insulating material 170 at step 172. Insulating material 170 may be the same material as TBC material 134 or a different material having desired characteristics. Insulating material 170 may be deposited by any known deposition technique, including CVD, thermal spraying, selective laser melting, or selective laser sintering. Selective laser melting and selective laser sintering processes are known in the art, as exemplified by Chapters 6 and 7 of "Laser-Induced Materials and Processes For Rapid Prototyping" by L. Lu, J. Y. H. Fuh, and Y. S. Wong, published by Kluwer Academic Publishers.

Additional sensors 176, 178 may be disposed at preselected depths within component 130 by forming respective trenches 180, 182 to appropriate depths. Trenches 180, 182 may be backfilled with insulating material 170 to the level of surface 138 at step 172. Planarization of surface 138 may be performed at step 184, if necessary, such as when surface 138 forms part of an airfoil. By forming a trench to a desired depth, a sensor may be embedded to within the TBC material layer 134, to within the bond coat material layer 136, to within the substrate material 132, or to a depth of an interface between any two of these layers.

Thus, it is possible to develop actual operating parameter data across a depth of a component or across the depth of the thermal barrier coating. Such data may be useful for confirming design assumptions and for updating computerized models, and it may also be useful as an indicator of damage or degradation of a TBC coating. For example, a sensor 178 embedded below the TBC material 134 may produce a signal indicating a significant temperature rise in the event of cracking or spalling of the layer of TBC material 134. Alternatively, the detection of a predetermined level of vanadium, sodium or sulfur deposits by an embedded sensor 176 may announce conditions that would give rise to spalling and failure of the TBC coating 134 if the component were to remain in service for an extended period. This process facilitates the placement of sensors at any location on a fully assembled and coated part. Electrochemical sensors on the component surface can play an important role in determining the nature and effect of corrosion products present in the surrounding environment.

MEMS sensors or devices typically include microelectronic packaging, integrating antenna structures for command signals into microelectromechanical structures for desired sensing or actuation functions. Silicon and high temperature electro-ceramics, such as GaN, SiC and AlN micromaching as well as others are advanced micromaching technologies that are commonly used to fabricate MEMS devices having dimensions in the sub-millimeter range. This allows for fashioning microscopic mechanical parts out of silicon substrate or on a silicon substrate, making the structures 3-dimensional, which allows for an array of applications. Electronic circuits functioning as transmitters and antennas may also be imprinted on the chips for wireless transmission. The inventors of the present invention have determined that deploying MEMS devices as integral parts of various components and locations of combustion turbine 10 allows for improved monitoring of component and system operating parameters. This allows for improved diagnostics, predictive maintenance and proof of design. Another advantage is prognosis for design, which may use physics-based approaches towards understanding failures.

Figure 13:
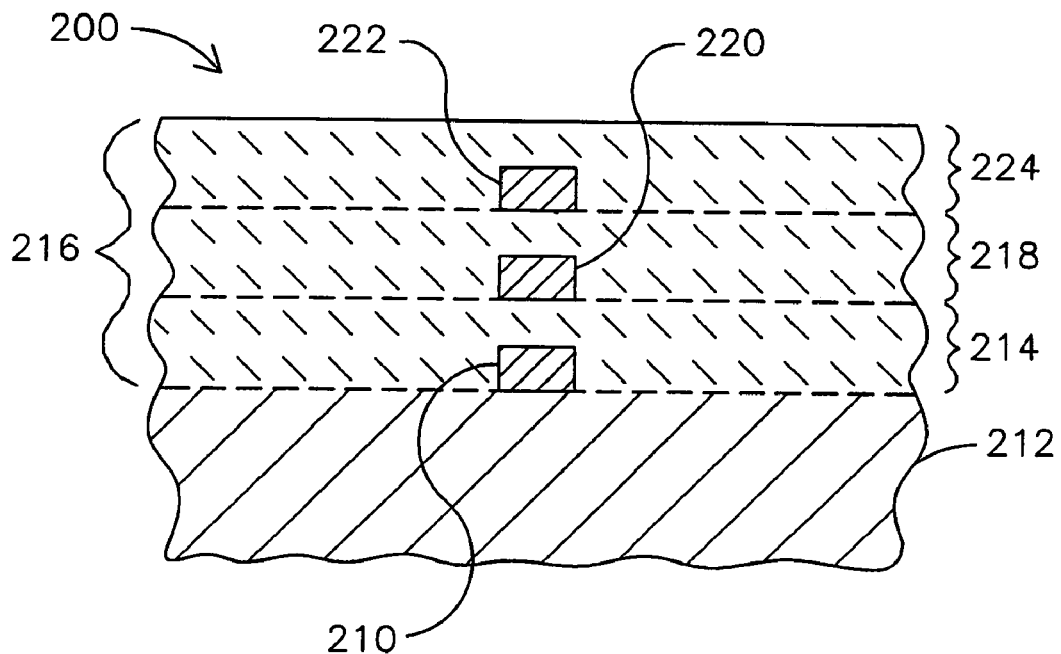
FIG. 13 is a partial cross-sectional view of a component having a plurality of sensors embedded at varying depths below a surface of the component.

FIG. 13 illustrates a component 200 that may be formed by depositing a first sensor 210 onto a surface of a substrate 212. Subsequently, a first layer 214 of a barrier coating 216, such as a CMC abradable coating system disclosed in U.S. Pat. No. 6,197,424, for example, is deposited over the sensor 210. A second sensor 220 is then deposited over the first layer 214. A second layer 218 of barrier coating 216 is then deposited, followed by the deposition of a third sensor 222 and third layer 224 of the barrier coating. In this manner, one or more sensors 210, 220, 222, which may be various MEMS devices configured for performing various functions may be embedded at a plurality of depths within the confines of a wall of a component 200. One may appreciate that the same component 200 may be formed with various combinations of MEMS sensors 210, 220, 222 configured to monitor various types of conditions associated with component 200.

For example, embodiments of the structure of FIG. 13 may be useful for monitoring various properties of coating 216 such as the amount of wear of an abradable coating system, since each of the sensors 210, 220, 222 may become exposed at a different time as the coating 216 undergoes wear due to abrasion. Signals generated by the respective sensors 210, 220, 222 may be responsive to the wear of coating 216 and may be used in an improved clearance control program for predicting the remaining useful life of an abradable coating and/or for estimating the amount of leakage past an abradable seal.

Figure 14:
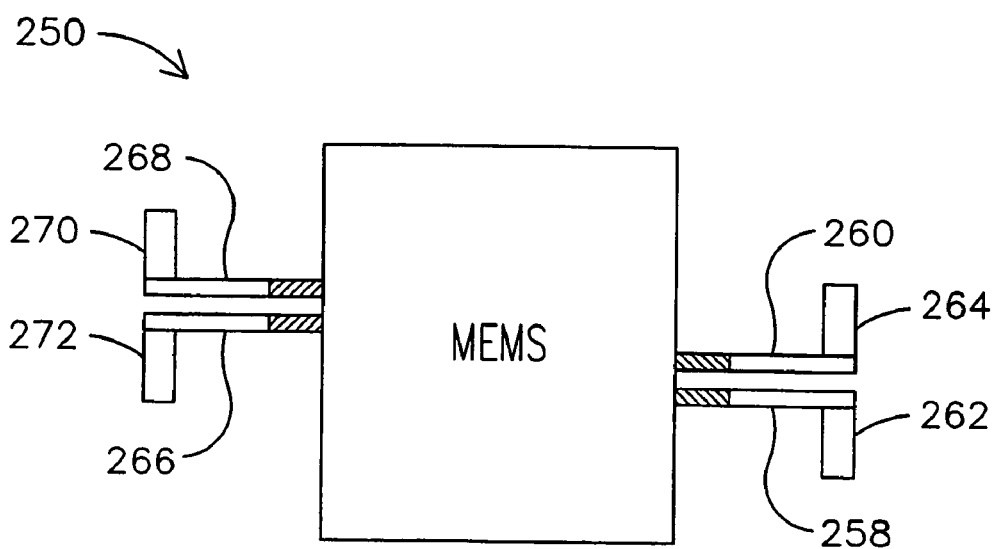
FIG. 14 is schematic plan view of an exemplary microelectromechanical system (MEMS) device.

FIG. 14 illustrates a schematic plan view of an exemplary MEMS device or sensor 250 that may be affixed to a component's substrate, such as directly onto a surface of the substrate, using phosphate cement or glue. MEMS device 250 may be affixed beneath the substrate's surface such as by affixing within an indentation or recess then covered with an over layer of protective coating. It may alternately be affixed to the substrate by being retained within a barrier coating or otherwise properly secured in place for its intended purpose. Embodiments of MEMS sensor 250 may be conductively coupled to leads 258, 260, 266, 268 and conductors 262, 264, 270, 272, respectively, which may be deposited using thermal spray deposition, for example, such as the conformal direct write technology disclosed in U.S. Pat. No. 6,576,861. Other deposition processes may be used as recognized by those skilled in the art.

A plurality of sensors 250 may be affixed at varying depths within a coating such as an abradable coating system 216. Thermal sprayed abradable coating systems 216 are typically applied for gas path clearance control, which influences power output and efficiency of combustion turbine 10. Coating systems 216 are usually porous coatings that abrade when contacted by a moving structural component, such as the tips of blades 18 and are designed not to damage the contacting surface. Information with respect to the wear behavior of coating system 216 may be used to predict the useful life of the coating, prevent catastrophic interaction between components and allow for improved control of combustion turbine 10.

MEMS sensor 250 may be configured as a proximity sensor that operates under capacitance or inductance. Sensor 250 may be an inductive proximity sensor comprising a coil, an oscillator, a detection circuit and an output circuit as recognized by those skilled in the art. The oscillator generates a fluctuating magnetic field around the winding of the coil that locates in the MEMS device's sensing face. When a metal object moves into the inductive proximity sensor's field of detection, eddy circuits build up in the metallic object, magnetically push back, and finally dampen the sensor's 250 own oscillation field. The detection circuit monitors the oscillator's strength and triggers an output from the output circuitry when the oscillator becomes dampened to a sufficient level.

One or more conductive connectors, such as a connector 52 may be provided as a means for routing data signals indicative of the measured response from sensor 250 to a transmitter 54, which may be configured for wirelessly transmitting the data signal to a transceiver 56, such as those shown in FIG. 1. Connector 52 may be one or a plurality of electrical leads for conducting a signal from sensor 250 via conductors 270, 272 to a transmitter such as surface mounted transmitter 54. Alternate embodiments allow for the signal to be conducted to an antenna (not shown), which may be an inductively couple spiral coil for wirelessly transmitting data signals from sensor 250 to a transmitter 54 and/or transceiver 56.

Exemplary embodiments of MEMS sensor 250 may be configured to produce an eddy current circuit to detect intrusions into abradable coating system 216. Such intrusions may be the tips of rotating blades 19 in compressor 12 or blades 18 in turbine 16 abrading coating 216 during operation of combustion turbine 10. Intrusions between other components may be detected within the casing of compressor 12 or turbine 16 at various other places of interest.

Embodiments of MEMS sensor 250 may be an inductive proximity sensor having circuitry that generates an electromagnetic field and detects any changes in a resonant circuit caused by eddy current losses induced in a conductive material influencing the magnetic field. When an AC voltage is applied to MEMS sensor 250 an oscillating current radiates an electromagnetic field. When an electrical conductor or metal component such as a tip of blade 18, for example, enters the electromagnetic field, eddy currents are drawn from the oscillator and induced into the blade tip. The losses in energy caused by the eddy currents may be correlated to the distance and position of the blade tip relative to MEMS sensor 250.

Figure 15:
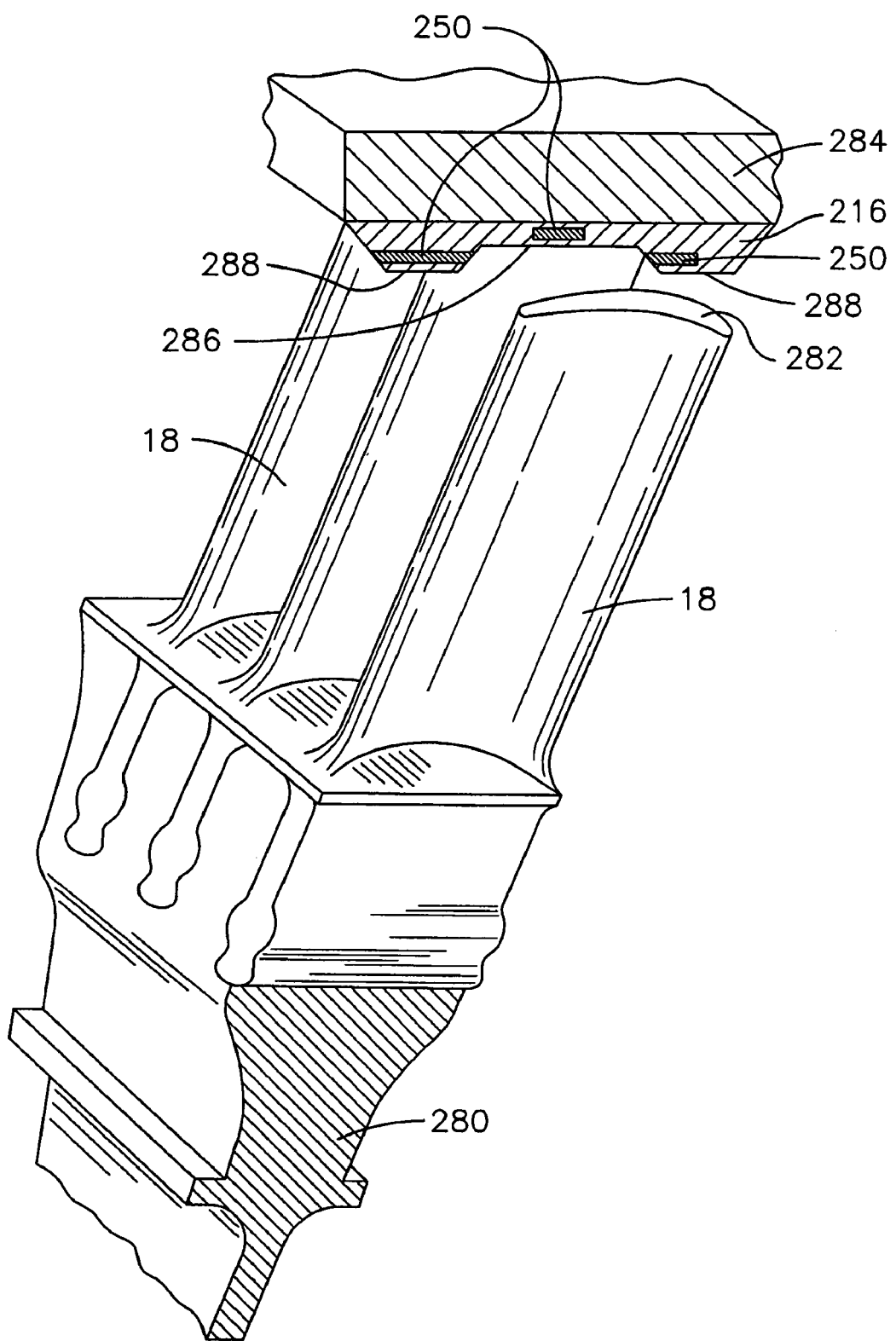
FIG. 15 is a perspective view of exemplary MEMS device embedded in an abradable coating system.

FIG. 15 is a partial perspective view of turbine blades 18 intruding into abradable coating system 216 during rotation of the blades such as when combustion turbine 10 is in operation. A plurality of blades 18 is mounted to a rotor disk 280. Blade tips 282 are located just inside an inner wall 284, which may be a blade outer air seal or ring segment of combustion turbine 10 as recognized by those skilled in the art. Abradable coating system 216 may be deposited on a ring segment 284 so that a groove 286 is abraded within the coating as blades 18 rotate. One or more MEMS sensors 250 may be affixed on or within the inner surface of ring segment 284, or within abradable coating system 216.

MEMS sensors 250 are depicted schematically as boxes in FIG. 15 but it will be appreciated they may be configured to perform various functions and be affixed in various configurations, orientations and locations. Embodiments of the invention may be used for continuously measuring the distance between blade tip 282 and one or more MEMS sensors 250 during operation of combustion turbine 16. In this aspect, a first distance between the end of a blade tip 282, or other selected locations on a blade 18, and the location of one or more MEMS sensors 250 is known. The first distance may be calculated and stored in database 36 of monitoring system 30 and may be the distance between a blade tip 282 and a MEMS sensor 250 prior to the commissioning of a combustion turbine 10. The first distance may be other distances depending on the desired measurements to be taken. It will be appreciated that blade tip 282 may be coated with a barrier coating such as TBC 26 (FIG. 1). The composition and thickness of such a coating may be accounted for when selecting a location for one or more MEMS sensors 250 and calculating wear of coating system 216.

Abradable coating system 216 has a first or original thickness when initially deposited on ring segment 284, or after repairing the coating, and prior to being abraded by blade tips 282. One or a plurality of MEMS sensors 250 may be affixed within coating system 216 at varying selected depths from the original surface 288 of coating system 216. For instance, a plurality of MEMS sensors 250 may be affixed in spaced relation around the circumference of ring segment 284 for taking a respective plurality of measurements with respect to a single row of blades 18. Ring segment 284 may include a row of ring segment sections that circumscribe the row of blades. Using MEMS sensors 250 is advantageous because a large quantity may be affixed in an area of interest to ensure data extraction in the event one or more sensors fail.

As blade tips 282 of the row of blades 18 abrade coating system 216, groove 286 is formed within coating 216 that is approximately the width of blades 18. Blades 18 abrading coating 216 forms a second or operating thickness of that portion of coating system 216 that is not worn away by blade tips 282. This operating thickness may be defined as the thickness of coating system 216 from the surface of groove 286 to the interface 283 of coating system 216 with ring segment 284. The operating thickness may vary around the circumference of a respective ring segment 284 as appreciated by those skilled in the art.

The plurality of MEMS sensors 250 may continuously transmit data to monitoring system 30 indicative of the distance between a respective sensor 250 and a respective blade tip 282. Data indicative of the distances blade tips 288 have traveled into coating 216 may be stored in database 36. This data may be used by processor 34 to calculate the amount or depth of wear the abradable coating system 216 is experiencing around the circumference of ring segment 284. In this respect, processor 34 may calculate the distance one or more blade tips 282 have traveled into coating system 216 during operation of combustion turbine 10 such as when going from start-up to full load.

Processor 34 may calculate the size of gaps formed between a blade tip 282 and the inner surface of groove 286, including its edges, such as gaps formed when a blade tip 282 contracts from its maximum incursion into coating system 216. Such gaps may be calculated knowing the original thickness of coating 216, the maximum incursion of blade tips 288 into coating 216 and the current distance between MEMS sensors 250 and blade tips 288. This allows for estimating secondary gas path flow past through the gaps, which may be used for more efficient operation of combustion turbine 10 and improved predictive maintenance. Calculations made by processor 34 based on data from MEMS sensors 250 may be related to operating cycles of combustion turbine 10 for various purposes including improved control during operating, cooling and service cycles of combustion turbine 10, and avoidance of catastrophic failure.

Components within compressor 12 and turbine 16 may have different rates of thermal expansion so they expand and contract at different rates during heating and cooling of turbine 16. Blades 18 may expand more quickly than a rotor to which rotor disk 280 is mounted due to differences in their shape and mass. A control module of system 30 may use real-time and historical data from MEMS sensors 250 during operation or a heating and/or cooling cycle of turbine 16 to prevent blade tips 282 from impinging on the inner surface of ring segment 284 by controlling various operating parameters of combustion turbine 10. For example, the turbine engine ramp rates and shut down schedule as well as scheduled spin cool cycles may be controlled in response to data received from MEMS sensors 250.

This data may also be used to control combustion turbine 10 to avoid other "pinch points", which may occur between numerous components within compressor 12 or turbine 16 during heating and/or cooling cycles. Such "pinch points" may develop for numerous reasons such as distortion of ring segment 284 due to servicing, uneven wear around ring segment 284, or the encroachment of ring segment 284 toward blade tips 282. This may happen due to vibration-induced wear on the hook portions of the ring segment holding it in place within an isolation ring.

Aspects of the invention allow for using various embodiments of MEMS sensors 250 to directly interrogate components and coatings within combustion turbine 10 to acquire data indicative of information that is a function of the type of MEMS sensor used. MEMS devices configured to perform more than one function may also be used. FIG. 14 is a schematic of a MEMS device 250 that may be configured to perform various functions such as an accelerometer, for example, that may be used to measure vibration. An exemplary MEMS accelerometer 250 may consist of a proof mass suspended by a spring such as a cantilever or beam. When MEMS accelerometer 250 is subjected to acceleration, the inertia of the mass causes changes in the gap between it and the bulk of the device. The principle of measuring the gap between the mass and bulk of the device can be performed using a capacitive, piezoresistive, piezoelectric, thermal, resonance or surface acoustic waves (SAW) principle as recognized by those skilled in the art.

In this respect, response data from a MEMS accelerometer 250 may be analyzed by monitoring system 30 to determine vibration frequency, forces and displacement of components within combustion turbine 10. This information may be used in assessing operating conditions of combustion turbine 10 including setting air and fuel maps during commissioning, monitoring for wear as a result of service, evaluating combustion dynamics, evaluating components for changes in natural frequency, which may be indicative of cracks or other defects, and validation of design methodologies.

Embodiments of MEMS sensor 250 may be configured to perform other functions such as a load cell, pressure transducer, strain gauge, or temperature and heat flux sensors, for example, as recognized by those skilled in the art. A MEMS load cell 250 may include two bonded silicon wafers where the bottom layer contains an electrode pattern forming an array of capacitors with the top wafer acting as a common electrode. The load may be estimated through a change in capacitance between the flexible electrode and the rigid electrode. MEMS load cell 250 may be used to assess boundary conditions between components. Specifically, both static and dynamic contact force between two components may be measured. Such measurements may be used by monitoring system 30 to assess surface bearing stresses, critical in the prevention of wear, as well as providing feedback for calibration and validation of design methodologies and boundary conditions.

Embodiments allow for using MEMS pressure sensors 250, such as those in the two general classes of: (a) piezoresistive where a silicon diaphragm consisting of a few resistors in a Wheatstone bridge configuration allows for sense changes in pressure through changes in resistance; and (b) capacitive where the capacitance between a flexible membrane and a fixed plate changes as a function of pressure. MEMS pressure transducers 250 may be deployed in various places within combustion turbine 10 such as the engine inlet for measurement of pressure distribution or detection of inlet pressure instabilities. Also, using MEMS pressure sensors 250 for sensing between stages of compressor 12 allows for detecting rotating stalls and early surge detection. This data may be used by monitoring system 30 for controlling operation of combustion turbine 10.

Embodiments allow for using MEMS devices 250 configured as strain gauge, temperature and heat flux sensors that may be based on the principles disclosed in "Microsensors, microelectromechanical systems (MEMS), and electronics for smart structures and systems" by V. K. Varadan and V. V. Varadan published by IOP Publishing LTD, United Kingdom. Such MEMS devices 250 may utilize the surface acoustic wave (SAW) properties of materials to measure static and dynamic strain, and the thermoelectric properties of the materials to measure temperature and heat flux. A SAW is typically a piezoelectric wafer such as lead zirconium titanate (PZT) and lithium niobate ($LiNbO_5$) class of materials, with interdigital transducers (IDT) and reflectors on its surface. The IDT converts electrical energy into mechanical energy and vice versa for generating and detecting SAW. The temperature and strain sensitive properties of the above class of materials may further be taken advantage of in measuring temperature and heat flux.

Embodiments of MEMS devices 250 configured as strain gauges, temperature and heat flux sensors may be deployed in various places within combustion turbine 10. For example, MEMS strain sensors 250 may be affixed on blades 18, 19 in compressor 12 and turbine 16 for measuring static and dynamic strains. MEMS temperature and heat flux sensors 250 may be utilized on blades 18 and vanes 22 in turbine 16 for measuring component thermal state, such as hot spots, cooling effectiveness, thermal efficiency and heat flux transients within the component or coating. This allows for an improved understanding of thermal environments in turbine 16 for materials development and design validation.

MEMS sensors 250 may be embedded directly into the surface of a component or frame of combustion turbine 10 as well as within coatings deposited on the component or frame. The MEMS sensors 250 may be insulated from the surrounding component or frame via an insulating layer of material that may be deposited by thermal spray or other techniques. Appropriate electrical connections may be made using conventional wires or conductive leads deposited by microplasma spray technology or other techniques such as ones described herein. Over layers of coatings may be deposited as necessary such as ones for wear resistance, dimensional control, oxidation resistance and thermal barriers.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A component for use in a combustion turbine, the component comprising:
    a substrate;
    a MEMS device affixed to the substrate; and
    at least one connector in electrical communication with the MEMS device for routing a data signal from the MEMS device to a termination location.

2. The component of claim 1 further comprising:
    a transmitter in electrical communication with the at least one connector for wirelessly transmitting the data signal outside the combustion turbine.

3. The component of claim 1 further comprising a barrier coating deposited on the substrate wherein the MEMS device is affixed beneath a surface of the barrier coating.

4. The component of claim 3 further comprising a trench formed in the barrier coating wherein the MEMS device is affixed to the barrier coating within the trench.

5. The component of claim 4 further comprising a backfill material deposited in the trench over the MEMS device.

6. The component of claim 3 further comprising a plurality of trenches formed in the barrier coating at respective different depths below the surface of the barrier coating and a MEMS device deposited within each of the plurality of trenches.

7. The component of claim 3, the MEMS device comprising a proximity sensor configured to detect intrusion of an object into the barrier coating.

8. The component of claim 1, the MEMS device selected from the group consisting of a MEMS accelerometer, a MEMS load cell, a MEMS strain gauge, a MEMS temperature sensor, a MEMS heat flux sensor, a MEMS flow sensor and a MEMS pressure transducer.

9. A turbine comprising:
    a turbine comprising a row of turbine blades and a row of ring segments circumscribing the row of blades;
    a MEMS device affixed to a component within the turbine;
    at least one connector in electrical communication with the MEMS device for routing a data signal from the MEMS device to a termination location;
    a monitoring system comprising a processing module programmed for receiving data from the MEMS device; and
    a transmitter for receiving the data signal from the termination location and transmitting the data signal to the monitoring system.

10. The turbine of claim 9, the MEMS device selected from the group consisting of a MEMS accelerometer, a MEMS load cell, a MEMS strain gauge, a MEMS temperature sensor, a MEMS heat flux sensor, a MEMS flow sensor and a MEMS pressure transducer.

11. The turbine of claim 9 further comprising a barrier coating deposited on a ring segment wherein the MEMS device is affixed beneath a surface of the barrier coating.

12. The turbine of claim 11 further comprising a trench formed in the barrier coating wherein the MEMS device is affixed to the barrier coating within the trench.

13. The turbine of claim 9 further comprising:
    an abradable coating system deposited on a ring segment;
    the MEMS device comprising a proximity sensor affixed beneath a surface of the abradable coating system configured to detect intrusion of an object into the abradable coating system; and
    wherein the processing module is programmed to calculate a clearance between a tip of at least one blade of the row of blades and the MEMS device based on data received from the MEMS device.

14. The turbine of claim 9 further comprising:
    a barrier coating deposited on the component;
    the MEMS device comprising a pressure transducer affixed beneath a surface of the barrier coating; and wherein the processing module is programmed to detect wear of the barrier coating based on data received from the MEMS device.

15. The turbine of claim 9 further comprising:
a barrier coating deposited on the component; and
a plurality of trenches formed in the barrier coating at respective different depths below the surface of the barrier coating and a MEMS device deposited within each of the plurality of trenches.

16. The turbine of claim 9, the MEMS device comprising a load cell configured to measure static and dynamic contact forces between the first component and a second component within the turbine.

17. The turbine of claim 9, the MEMS device comprising a strain gauge affixed to at least one of the plurality of turbine blades configured to measure static and dynamic strains on the at least one of the plurality of turbine blades.

18. The turbine of claim 9, the MEMS device comprising a heat flux sensor affixed to the first component configured to measure a thermal state of the component.

19. The turbine of claim 9 further comprising:
an abradable coating system deposited on a surface of the ring segment;
a trench formed in the abradable coating system;
the MEMS device deposited in the trench; and
a backfill material deposited in the trench over the MEMS device.

20. A monitoring system for use with a turbine, the monitoring system comprising:
at least one MEMS device configured for use with the turbine;
a processing module programmed to receive data from the at least one MEMS device and to develop information based on the received data; and
a transmitter for transmitting data from the at least one MEMS device to the processing module.

21. The monitoring system of claim 20, the processing module programmed to generate a control signal responsive to the received data, the control signal useful for controlling an operating parameter of the turbine.

22. The monitoring system of claim 21, the at least one MEMS device comprising a MEMS proximity sensor wherein the control signal is useful for controlling a clearance between a row of turbine blades and a ring segment.

23. The monitoring system of claim 20, the at least one MEMS device comprising a load cell wherein the processing module is programmed to develop information with respect to static and dynamic contact forces between a first component within the turbine and a second component within the turbine.

24. The monitoring system of claim 20, the at least one MEMS device comprising a heat flux sensor wherein the processing module is programmed to develop information with respect to a thermal state of a component within the turbine.

25. The monitoring system of claim 20, the at least one MEMS device comprising a strain gauge wherein the processing module is programmed to develop information with respect to static and dynamic strains on at least one turbine blade.

* * * * *